(12) United States Patent
Jiang et al.

(10) Patent No.: US 10,708,975 B2
(45) Date of Patent: Jul. 7, 2020

(54) METHOD AND APPARATUS FOR CONFIGURING RADIO BEARER

(71) Applicant: Beijing Xiaomi Mobile Software Co., Ltd., Beijing (CN)

(72) Inventors: Xiaowei Jiang, Beijing (CN); Wei Hong, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/363,120

(22) Filed: Mar. 25, 2019

(65) Prior Publication Data
US 2019/0223251 A1 Jul. 18, 2019

Related U.S. Application Data

(63) Continuation of application No. PCT/CN2016/100159, filed on Sep. 26, 2016.

(51) Int. Cl.
| | |
|---|---|
| *H04W 4/00* | (2018.01) |
| *H04W 80/08* | (2009.01) |
| *H04L 5/00* | (2006.01) |
| *H04W 88/08* | (2009.01) |
| *H04L 29/06* | (2006.01) |
| *H04W 76/19* | (2018.01) |
| *H04W 76/11* | (2018.01) |
| *H04W 80/02* | (2009.01) |
| *H04W 88/12* | (2009.01) |
| *H04W 76/10* | (2018.01) |
| *H04W 24/02* | (2009.01) |

(52) U.S. Cl.
CPC .............. *H04W 80/08* (2013.01); *H04L 5/00* (2013.01); *H04L 69/08* (2013.01); *H04L 69/18* (2013.01); *H04W 76/11* (2018.02); *H04W 76/19* (2018.02); *H04W 80/02* (2013.01); *H04W 88/085* (2013.01); *H04W 88/12* (2013.01); *H04W 24/02* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 2005/0193136 A1* | 9/2005 | Burckart | H04L 67/42 709/230 |
| 2018/0317103 A1* | 11/2018 | Luo | H04W 92/20 |
| 2019/0045574 A1* | 2/2019 | Feng | H04W 76/12 |
| 2019/0141169 A1* | 5/2019 | Ni | H04L 69/24 |

* cited by examiner

*Primary Examiner* — Clemence S Han
(74) *Attorney, Agent, or Firm* — Finnegan, Henderson, Farabow, Garrett & Dunner, L.L.P.

(57) ABSTRACT

A method for configuring a radio bearer includes: sending by a central unit protocol partitioning information for the radio bearer to be configured to a target distributed unit, in which the protocol partitioning information indicates an assignment of each protocol layer of a radio-side protocol stack between the central unit and the target distributed unit; configuring a first protocol stack by the target distributed unit according to the protocol partitioning information; sending by the target distributed unit configuration information of the first protocol stack to the central unit; and configuring a second protocol stack by the central unit according to the configuration information of the first protocol stack.

20 Claims, 9 Drawing Sheets

METHOD AND APPARATUS FOR CONFIGURING RADIO BEARER

CROSS REFERENCE TO RELATED APPLICATION

This application is a continuation application of International Application No. PCT/CN2016/100159, filed on Sep. 26, 2016, the entire contents of which are incorporated herein by reference.

TECHNICAL FIELD

The present disclosure generally relates to the field of radio communications technology, and more particularly, to a method, an apparatus and a system for configuring a radio bearer.

BACKGROUND

In a distributed radio access network, an upper protocol layer in a protocol stack on a radio access network side is generally centralized in order to reduce cost of base station deployment.

In related arts, the radio access network side of the distributed radio access network usually includes a CU (Central Unit) and at least two DUs (Distributed Units). For the protocol stack of the radio bearer on the radio access network side, an RRC protocol layer, a PDCP protocol layer, a RLC protocol layer and an MAC protocol layer are fixedly arranged in the central unit, and a PHY protocol layer is fixedly arranged in the distributed unit.

SUMMARY

The present disclosure provides a method for configuring a radio bearer. Technical solutions are described as follows.

According to a first aspect of embodiments of the present disclosure, a method for configuring a radio bearer includes: sending by a central unit protocol partitioning information for the radio bearer to be configured to a target distributed unit, in which the protocol partitioning information indicates an assignment of each protocol layer of a radio-side protocol stack between the central unit and the target distributed unit, the radio-side protocol stack is a radio network protocol stack corresponding to the radio bearer on a radio access network side, and the target distributed unit is one of the at least two distributed units; configuring a first protocol stack by the target distributed unit according to the protocol partitioning information, in which the first protocol stack includes first protocol layers assigned to the target distributed unit in the radio-side protocol stack; sending by the target distributed unit configuration information of the first protocol stack to the central unit; and configuring a second protocol stack by the central unit according to the configuration information of the first protocol stack, in which the second protocol stack includes second protocol layers assigned to the central unit in the radio-side protocol stack.

According to a second aspect of embodiments of the present disclosure, a method for configuring a radio bearer, applied to a central unit connecting to at least two distributed units is provided, includes: sending protocol partitioning information for the radio bearer to be configured to a target distributed unit, in which the protocol partitioning information indicates an assignment of each protocol layer of a radio-side protocol stack between the central unit and the target distributed unit, the radio-side protocol stack is a radio network protocol stack corresponding to the radio bearer on a radio access network side, and the target distributed unit is one of the at least two distributed units; receiving configuration information of a first protocol stack sent by the target distributed unit, in which the first protocol stack is configured by the target distributed unit according to the protocol partitioning information, and the first protocol stack includes first protocol layers assigned to the target distributed unit in the radio-side protocol stack; and configuring a second protocol stack according to the configuration information of the first protocol stack, in which the second protocol stack includes second protocol layers assigned to the central unit in the radio-side protocol stack.

According to a third aspect of embodiments of the present disclosure, a method for configuring a radio bearer applied to a target distributed unit is provided, in which the target distributed unit is one of at least two distributed units connecting to a central unit. The method includes: receiving protocol partitioning information for the radio bearer to be configured, in which the protocol partitioning information is sent by the central unit and indicates an assignment of each protocol layer of a radio-side protocol stack between the central unit and the target distributed unit, and the radio-side protocol stack is a radio network protocol stack corresponding to the radio bearer on a radio access network side; configuring a first protocol stack according to the protocol partitioning information, in which the first protocol stack includes first protocol layers assigned to the target distributed unit in the radio-side protocol stack; and sending configuration information of the first protocol stack to the central unit, such that the central unit configures a second protocol stack according to the configuration information of the first protocol stack, in which the second protocol stack includes second protocol layers assigned to the central unit in the radio-side protocol stack.

According to a fourth aspect of embodiments of the present disclosure, a device for configuring a radio bearer applied to a central unit connecting to at least two distributed units is provided. The device includes: a processor; a memory configured to store an instruction executable by the processor; in which the processor is configured to: send protocol partitioning information for the radio bearer to be configured to a target distributed unit, in which the protocol partitioning information indicates an assignment of each protocol layer of a radio-side protocol stack between the central unit and the target distributed unit, the radio-side protocol stack is a radio network protocol stack corresponding to the radio bearer on a radio access network side, and the target distributed unit is one of the at least two distributed units; receive configuration information of a first protocol stack sent by the target distributed unit, in which the first protocol stack is configured by the target distributed unit according to the protocol partitioning information, and the first protocol stack includes first protocol layers assigned to the target distributed unit in the radio-side protocol stack; and configure a second protocol stack according to the configuration information of the first protocol stack, in which the second protocol stack includes second protocol layers assigned to the central unit in the radio-side protocol stack.

According to a fifth aspect of embodiments of the present disclosure, a device for configuring a radio bearer applied to a target distributed unit is provided, in which the target distributed unit is one of at least two distributed units connecting to a central unit. The device includes: a processor; a memory configured to store an instruction executable by the processor; in which the processor is configured to:

receive protocol partitioning information for the radio bearer to be configured, in which the protocol partitioning information is sent by the central unit and indicates an assignment of each protocol layer of a radio-side protocol stack between the central unit and the target distributed unit, and the radio-side protocol stack is a radio network protocol stack corresponding to the radio bearer on a radio access network side; configure a first protocol stack according to the protocol partitioning information, in which the first protocol stack includes first protocol layers assigned to the target distributed unit in the radio-side protocol stack; and send configuration information of the first protocol stack to the central unit, such that the central unit configures a second protocol stack according to the configuration information of the first protocol stack, in which the second protocol stack includes second protocol layers assigned to the central unit in the radio-side protocol stack.

It is to be understood that both the foregoing general description and the following detailed description are exemplary and explanatory only and are not restrictive of the present disclosure.

BRIEF DESCRIPTION OF THE DRAWINGS

Accompanying drawings herein are incorporated in and constitute a part of the specification, and illustrate exemplary embodiments in line with the present disclosure, and serve to explain the principle of the present disclosure together with the description.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
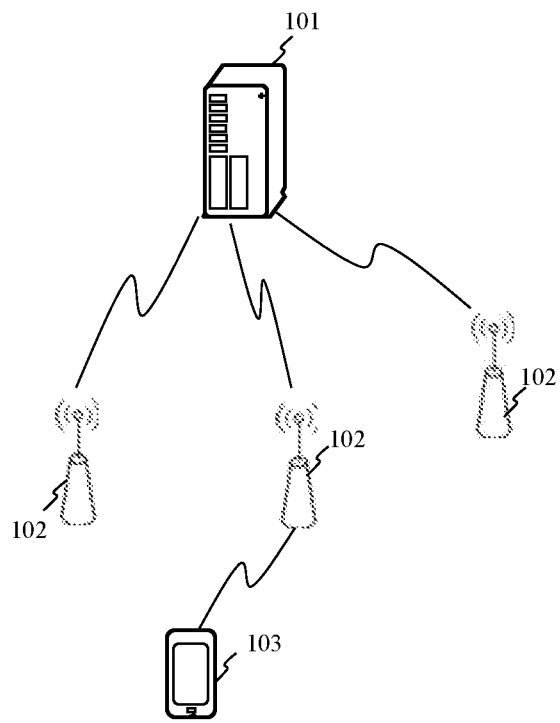
FIG. 1 is a schematic diagram illustrating an implementing environment related to a method for configuring a radio bearer according to an exemplary embodiment of the present disclosure.

FIG. 1 is a schematic diagram illustrating an implementing environment related to a method for configuring a radio bearer according to an exemplary embodiment of the present disclosure. As shown in FIG. 1, the implementing environment may include: a central unit 101, at least two distributed units 102 and a terminal 103.

An access point device on a RAN (Radio Access Network) side in a distributed radio access network includes the central unit 101 and the at least two distributed units 102. For example, a distributed base station includes the central unit 101 and the at least two distributed units 102.

The central unit 101 connects to a core network in a communication network. The central unit 101 connects to and communicates with the at least two distributed units 102. The central unit 101 may also connect to the at least two distributed units 102 via an optical fiber or via other communication lines.

The at least two distributed units 102 wirelessly connect to the terminal 103 via a wireless interface (i.e., an air interface), in which the wireless interface may be based on various mobile communication technologies. For example, the wireless interface may be based on a 3G (Third Generation) technical standard including CDMA (Code Division Multiple Access) 2000, WCDMA (Wideband Code Division Multiple Access), and TD-SCDMA (Time Division-Synchronous Code Division Multiple Access), or based on a 4G (Fourth Generation) technical standard including TD-LTE (Time Division Long Term Evolution) and FDD-LTE (Frequency Division Duplexing Long Term Evolution), or based on a 5G (Fifth Generation) technical standard or even a next generation telecommunication later than 5G.

A wireless connection between the terminal 103 and a radio access network side includes one or more radio bearers (including signaling bearers and data bearers). The radio bearers include a series of protocol layers allocated to the terminal 103 on the radio access network side (i.e., the central unit 101 and the at least two distributed units 102 in the implementing environment) and configurations of the protocol layers, providing an ability for communicating data from the terminal to the core network. A complete protocol stack consisting of the series of protocol layers reflects a process for transmitting a signal or data in the radio access network: from an upper protocol layer on a sending side to a lower protocol layer on the sending side, then from a lower protocol layer on the receiving side to an upper protocol layer on the receiving side.

Figure 2:
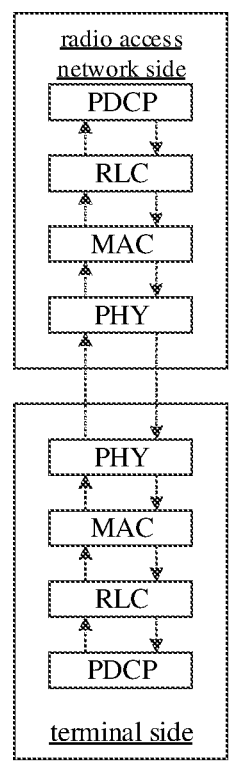
FIG. 2 is a schematic diagram illustrating protocol layers of a radio bearer according to an exemplary embodiment of the present disclosure.

Take LTE as an example. As shown in FIG. 2, a schematic diagram illustrating the protocol layers of a radio bearer is shown. A PDCP (Packet Data Convergence Protocol) layer, an RLC (Radio Link Control) layer, a MAC (Media Access Control) layer, and a PHY (Physical) layer of the radio bearer are configured on both the radio access network side and a terminal side, respectively. The signal or data may be processed by the PDCP layer, the RLC layer, the MAC layer, and the PHY layer successively on the radio access network side, then may be sent to the terminal by a radio frequency unit on the radio access network side and received by a radio frequency unit on the terminal side, and then may be processed by the PHY layer, the MAC layer, the RLC layer and the PDCP layer successively on the terminal side, when the signal or data is transmitted wirelessly from the radio access network side to the terminal via the radio bearer. Accordingly, a processing order of the protocol layers may be opposite to the processing order described above when the signal or data is transmitted from the terminal to the radio access network side via the radio bearer.

Figure 3:
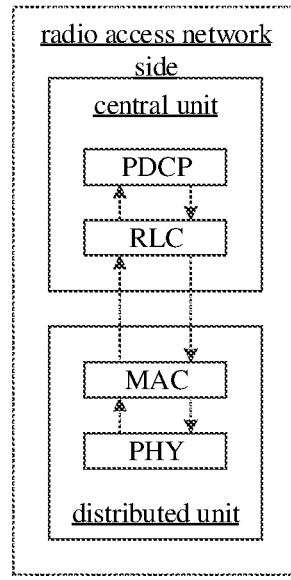
FIG. 3 is a schematic diagram illustrating protocol layers on a radio access network side according to an exemplary embodiment of the present disclosure.

In the implementing environment, the protocol layers of the radio bearer on the radio access network side are allocated to the central unit and the at least two distributed units respectively, which means that some of the protocol layers of the radio bearer on the radio access network side are allocated to the central unit and some of the protocol layers of the radio bearer on the radio access network side are allocated to the at least two distributed units respectively when the radio bearer is configured. For example, referring to FIG. 3, a schematic diagram of the protocol layers on the radio access network side is illustrated, the radio access network side includes the central unit and distributed units, the PDCH layer and the RLC layer of the radio bearer are configured in the central unit, and the MAC layer and the PHY layer of the radio bearer are configured in the distributed unit.

Partitions of the protocol layers corresponding to the radio bearer described above are illustrated merely by taking LTE as the example, which are not limited thereto in practical applications. For example, other structures of the protocol layers may be used in 5G network or even a next generation mobile telecommunication network. For example, a complete protocol stack of a radio bearer may include more or less protocol layers, each of which may be provided with a function different from that of the corresponding protocol layer in LTE. The structures of the protocol layers corresponding to the radio bearer and the functions of the protocol layers are not limited in embodiments of the present disclosure.

Figure 4:
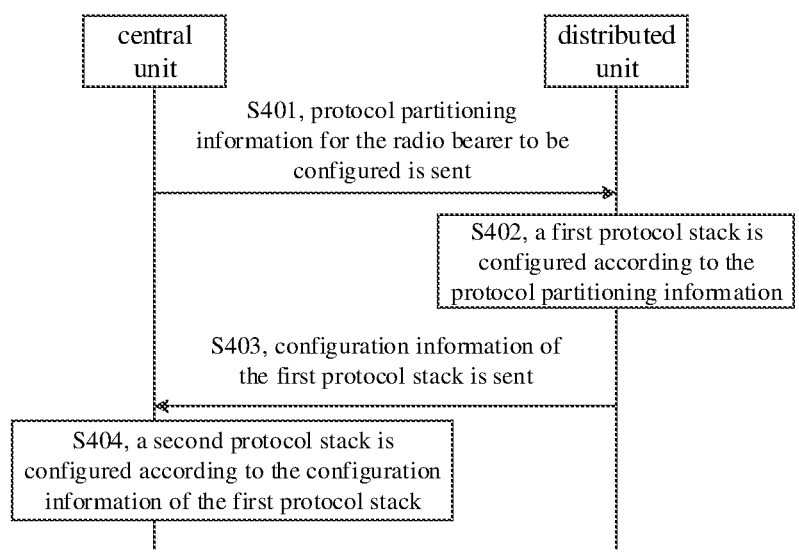
FIG. 4 is a flow chart illustrating a method for configuring a radio bearer according to an exemplary embodiment of the present disclosure.

FIG. 4 is a flow chart illustrating a method for configuring a radio bearer according to an exemplary embodiment of the present disclosure. As shown in FIG. 4, the method is applied to the implementing environment illustrated in FIG. 1, which includes following steps.

In step S401, the central unit sends protocol partitioning information for the radio bearer to be configured to a target distributed unit.

The protocol partitioning information indicates an assignment of each protocol layer of a radio-side protocol stack between the central unit and the target distributed unit, the radio-side protocol stack is a radio network protocol stack corresponding to the radio bearer on a radio access network side, and the target distributed unit is one of the at least two distributed units connected to the central unit.

In step S402, the target distributed unit configures a first protocol stack according to the protocol partitioning information, in which the first protocol stack includes first protocol layers assigned to the target distributed unit in the radio-side protocol stack.

In step S403, the target distributed unit sends configuration information of the first protocol stack to the central unit.

In step S404, the central unit configures a second protocol stack according to the configuration information of the first protocol stack, in which the second protocol stack includes second protocol layers assigned to the central unit in the radio-side protocol stack.

The radio-side protocol stack of the radio bearer includes the first protocol stack in the target distributed unit and the second protocol stack in the central unit.

In an embodiment, the method further includes: sending the configuration information of the first protocol stack and the configuration information of the second protocol stack to a terminal by the target distributed unit, such that the terminal configures the radio network protocol stack corresponding to the radio bearer on a terminal side according to the configuration information of the first protocol stack and the configuration information of the second protocol stack.

According to the method for configuring the radio bearer described in embodiments of the present disclosure, for a radio network protocol stack corresponding to the radio bearer to be configured on a radio access network side, the central unit and the target distributed unit negotiate about protocol layers of the radio network protocol stack to be allocated in the central unit and the target distributed unit respectively and perform corresponding configurations respectively, which means that the partition of the protocol layers between the central unit and the target distributed unit is not fixed in a distributed radio access network. Instead, the protocol layers are partitioned according to indications of the central unit and various means of the partitions of the protocol layers on the radio access network side are provided, such that the radio bearer may be applied to different service requirements flexibly and an access performance of a radio access network may be improved.

The radio bearer to be configured according to the embodiment illustrated in FIG. 4 may be an SRB (signaling radio bearer) or a DRB (data radio bearer). Besides, solutions according to the embodiment illustrated in FIG. 4 may be applied to the terminal or the radio access network side to establish a wireless connection, for example, in a scenario of configuring the SRB when an RRC (Radio Resource Control) connection is established, and also may be applied after the wireless connection is established to add the SRB or the DRB, or, may be applied for reconfiguring the existing SRB or DRB. Following embodiments of the present disclosure will describe two scenarios mentioned above.

Figure 5:
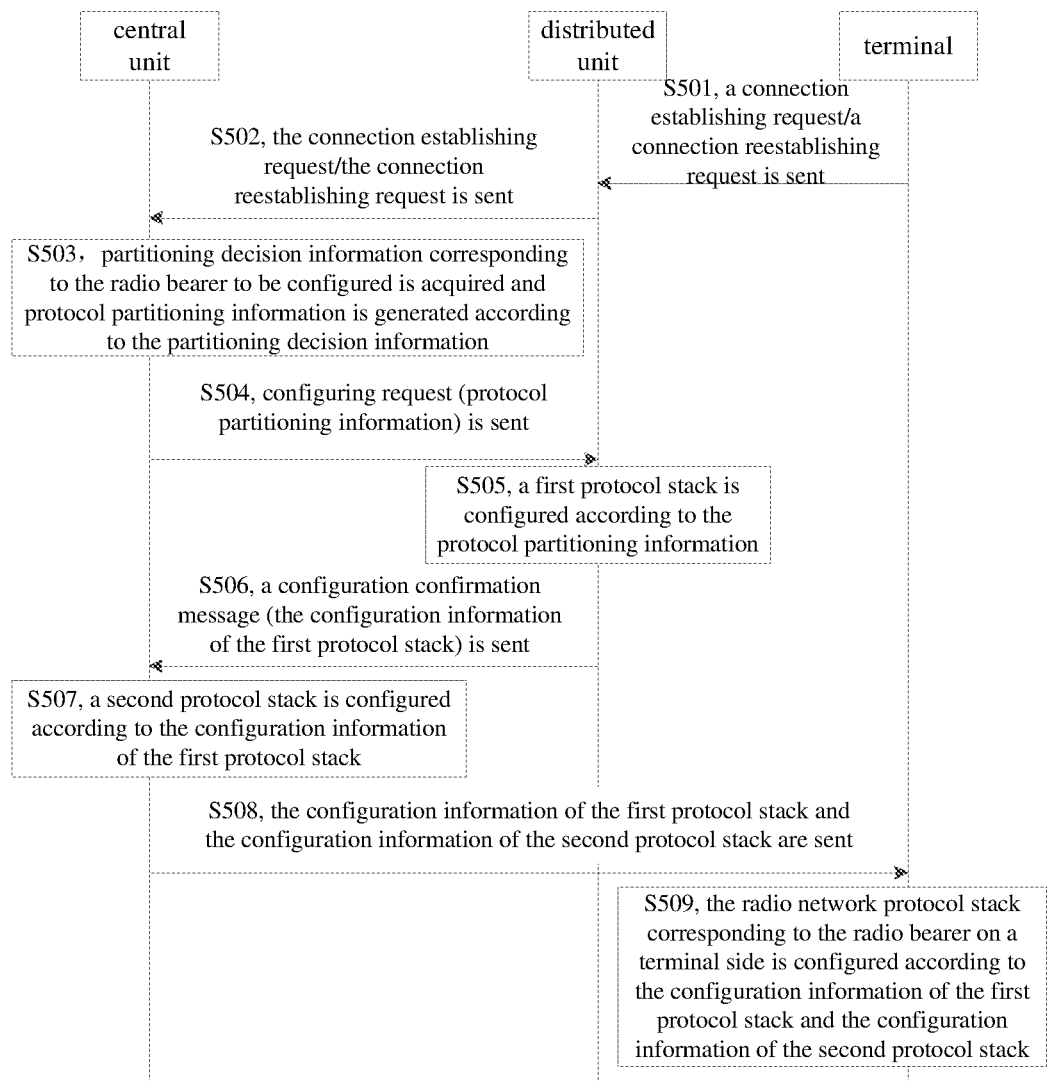
FIG. 5 is a flow chart illustrating a method for configuring a radio bearer according to an exemplary embodiment of the present disclosure.

FIG. 5 is a flow chart illustrating a method for configuring a radio bearer according to an exemplary embodiment of the present disclosure. As shown in FIG. 5, the method for configuring the radio bearer is applied to the implementing environment in FIG. 1. For example, the SRB is configured when a wireless connection is established on a terminal and a radio access network side, and the method may include following steps.

In step S501, the terminal sends a connection establishing request or a connection reestablishing request to the target distributed unit; and the target distributed unit receives the connection establishing request or the connection reestablishing request.

The target distributed unit may be one of the at least two distributed units 102 in the implementing environment illustrated in FIG. 1. The terminal may send the connection establishing request to the target distributed unit when the terminal needs to access the radio access network via the target distributed unit. The connection reestablishing request may also be sent to the target distributed unit when the terminal needs to re-access the radio access network via the target distributed unit after the connection between the terminal and the target distributed unit is interrupted or when the terminal switches to the target distributed unit from another distributed unit.

In step S502, the target distributed unit sends the connection establishing request or the connection reestablishing request to the central unit; and the central unit receives the connection establishing request or the connection reestablishing request.

In an embodiment, information on the cell the terminal tries to access, such as a cell identification (all or a part of fields of an ID for identifying a cell uniquely in the network), a physical cell identification (a cell identification used in the physical layer, which is usually distinguished by different synchronizing signals or reference numbers) and a cell frequency point, may be provided to the central unit when the target distributed unit sends the connection establishing request and the connection reestablishing request to the central unit, and the central unit may decide whether to perform the following steps according to the information.

In step S503, the central unit acquires partitioning decision information corresponding to the radio bearer to be configured and protocol partitioning information may be generated according to the partitioning decision information.

The radio bearer may be the SRB configured in a process for establishing the wireless connection, the protocol partitioning information indicates an assignment of each protocol layer of a radio-side protocol stack between the central unit and the target distributed unit, and the radio-side protocol stack corresponds to the radio bearer on a radio access network side.

The partitioning decision information includes at least one of a quality of service requirement of a service corresponding to the radio bearer, loading information of the central unit and the target distributed unit, and delay information between the central unit and the target distributed unit.

Figure 6:
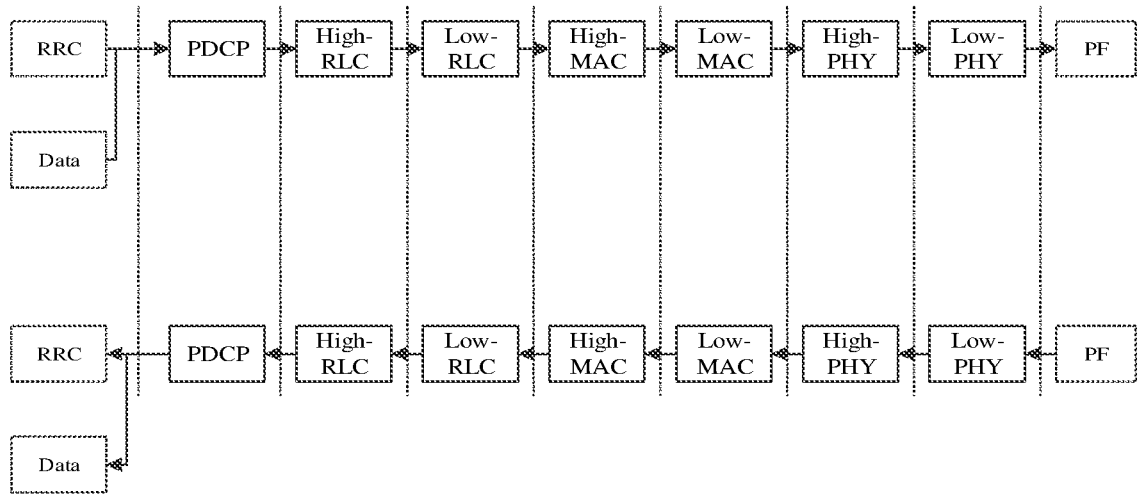
FIG. 6 is a schematic diagram illustrating a partition for a radio-side protocol stack related to the exemplary embodiment of FIG. 5.

Referring to FIG. 6, a schematic diagram illustrating a partition for a radio-side protocol stack related to the embodiments of the present disclosure is shown. A complete protocol stack configured in the central unit and the target distributed unit includes a PDCP layer, a High-RLC layer, a Low-RLC layer, a High-MAC layer, a Low-MAC layer, a High-PHY layer and a Low-PHY layer, and eight assignments of the protocol layers are described as follows:

1) All the protocol layers are assigned to the target distributed unit;
2) the PDCP layer is assigned to the target distributed unit, and the High-RLC layer to the Low-PHY layer are assigned to the central unit;
3) the PDCP layer and the High-RLC layer are assigned to the target distributed unit, and the Low-RLC layer to the Low-PHY layer are assigned to the central unit;
4) the PDCP layer to the Low-RLC layer are assigned to the target distributed unit, and the High-PHY layer to the Low-PHY layer are assigned to the central unit;
5) the PDCP layer to the High-MAC layer are assigned to the target distributed unit, and the Low-MAC layer to the Low-PHY layer are assigned to the central unit;
6) the PDCP layer to the Low-MAC layer are assigned to the target distributed unit, and the High-PHY layer to the Low-PHY layer are assigned to the central unit;
7) the PDCP layer to the High-PHY layer are assigned to the target distributed unit, and the Low-PHY layer is assigned to the central unit; and
8) all the protocol layers are assigned to the central distributed unit.

The eight assignments are merely examples when the complete protocol stack configured in the central unit and the target distributed unit includes the PDCP layer, the High-RLC layer, the Low-RLC layer, the High-MAC layer, the Low-MAC layer, the High-PHY layer and the Low-PHY layer. In practical applications, the assignments of the protocol layers may be various according to a number of the protocol layers and functions of the protocol layers.

Influences of the partitions of the complete protocol stack configured in the central unit and the target distributed unit mentioned above on the network may be different. For example, when partitioning between the MAC layer and the PHY layer, more link bandwidth between the central unit and the target distributed unit may be consumed by a signal or data transmission of the radio bearer, but robustness of low delay may be improved at the same time and a higher combined gain may be provided, which is suitable for services at low rate, high reliability and low delay. For services at high rate, however, with this partition, the radio bearer may consume more link bandwidth; and when partitioning between the PDCP layer and the RLC layer, less link bandwidth between the central unit and the target distributed unit may be consumed by the signal or data transmission of the radio bearer, but robustness of low delay and the combined gain may be lower.

In embodiments of the present disclosure, the central unit may acquire at least one of a quality of service requirement of a service corresponding to the radio bearer, loading information of the central unit and the target distributed unit, and delay information between the central unit and the target distributed unit after the radio bearer determines to configure the radio bearer. The partition of the complete protocol stack configured in the central unit and the target distributed unit may be determined according to at least one piece of information mentioned above.

For example, the partition may be conducted near the PDCP layer (for example, conducted between the PDCP layer and the RLC layer) if the quality of service requirement of the service corresponding to the radio bearer is higher, such that the quality of service requirement may be ensured. On the contrary, the partition may be conducted near the PHY layer (for example, conducted between the MAC layer and the PHY layer) if the quality of service requirement of the service corresponding to the radio bearer is lower.

Also for example, the partition may be conducted near the PDCP layer (for example, conducted between the PDCP layer and the RLC layer) if loading information of the central unit and the target distributed unit indicates that loads of the central unit are too high but the loads of the target distributed unit are low, such that the loads of the central unit may be reduced. On the contrary, the partition may be conducted near the PHY layer (for example, conducted between the MAC layer and the PHY layer) if loading information of the central unit and the target distributed unit indicates that loads of the central unit are too low but the loads of the target distributed unit are high.

As another example, the MAC layer and the PHY layer assigned to the central unit and the target distributed unit respectively may cause that the radio bearer fails to work if the delay between the central unit and the target distributed unit is higher, thus the partition may need to be conducted near the PDCP layer (for example, conducted between the PDCP layer and the RLC layer). On the contrary, the partition may be conducted between the MAC layer and the PHY layer if the delay between the central unit and the target distributed unit is lower.

The central unit may determine the partition of the protocol stack according to one of the quality of service requirement of the service corresponding to the radio bearer, the loading information of the central unit and the target distributed unit, and the delay information between the central unit and the target distributed unit, or may determine the partition of the protocol stack by combining two or three of the above information.

The central unit may determine the partition of the protocol stack according to the partitioning decision information and may generate the protocol partitioning information corresponding to the partitioning decision information. In some embodiments of the present disclosure, the protocol partitioning information may be an identification of a top protocol layer assigned to the target distributed unit in the radio-side protocol stack.

For example, take the eight assignments illustrated in FIG. 6 as an example, the protocol partitioning information may be the identification of the PDCP layer when the partition determined by the central unit according to the partitioning decision information corresponds to 1) Similarly, the protocol partitioning information may be the identification of the High-RLC layer when the partition determined by the central unit according to the partitioning decision information corresponds to 2), and so on. The protocol partitioning information may be a specific identification such as 0 or any identification other than the identifications mentioned above when the partition determined by the central unit according to the partitioning decision information corresponds to 8).

Still referring to FIG. 5, in step S504, the central unit sends a configuring request to the target distributed unit, and the target distributed unit receives the configuring request.

The configuring request includes the protocol partitioning information of the radio bearer to be configured.

In step S505, the target distributed unit may configure a first protocol stack according to the protocol partitioning information included in the configuring request.

The first protocol stack includes first protocol layers assigned to the target distributed unit in the radio-side protocol stack.

For example, it is assumed that the protocol partitioning information is the identification of the RLC layer, the target distributed unit may configure the RLC layer and the protocol layers lower than RLC layer in the target distributed unit according to the protocol partitioning information. The RLC layer and the protocol layers lower than the RLC layer configured by the target distributed unit serve as the first protocol stack.

In some embodiments of the present disclosure, the central unit may also send resource allocation indication information to the target distributed unit, in which the resource allocation indication information is configured to indicate to the target distributed unit allocating resource for configuring the first protocol stack, and the resource includes at least one of storage resource and computing resource.

For example, the central unit may send the resource allocation indication information along with the configuring request, or the central unit may send the resource allocation indication information via other information carriers. The resource allocation indication information may indicate how much storage resource and computing resource the target distributed unit allocates for configuring the first protocol stack. Accordingly, the storage resource and computing resource of the first protocol stack may be allocated according to the resource allocation indication information and the protocol layers in the first protocol stack may be configured based on the storage resource and computing resource allocated, when the target distributed unit configures the first protocol stack.

In step S506, the target distributed unit may send a configuration confirmation message to the central unit, in which the configuration confirmation message includes the configuration information of the first protocol stack, and the central unit receives the configuration confirmation message.

The target distributed unit may send the configuration information of the first protocol stack along with the configuration confirmation message to the central unit, after the first protocol stack is configured successfully.

The configuration information of the first protocol stack refers to the configuration information of each protocol layer in the first protocol stack, and different protocol layers correspond to different types of the configuration information. For example, the configuration information of the PDCP layer may include information on whether a state report is required, a SN (serial number) and a re-order timer size etc.; the configuration information of the RLC layer may include a transmission mode and a maximum transmission times of the RLC layer and so on, and the configuration information of the PDCP layer and the configuration information of the RLC layer are collectively known as bearer configuration information; the configuration information of the MAC layer may include BSR (Buffer Status Report) configuration and DRX (Discontinuous Reception) configuration etc.; the configuration information of the PHY layer may include respective physical channel configuration and an antenna configuration etc.

In step S507, the central unit configures a second protocol stack according to the configuration information of the first protocol stack, in which the second protocol stack includes second protocol layers assigned to the central unit in the radio-side protocol stack.

For example, the protocol partitioning information is an identification of the RLC layer, the configuration information of the RLC layer and the protocol layers below the RLC layer is sent to the central unit after the RLC layer and the protocol layers below the RLC layer of the radio bearer are configured by the target distributed unit, and the central unit configures the protocol layers above the RLC layer (for example, the PDCP layer) according to the configuration information of the RLC layer and the protocol layers below the RLC layer, in which the protocol layers above the RLC layer configured by the central unit serve as the second protocol stack.

In step S508, the central unit may send the configuration information of the first protocol stack and the configuration information of the second protocol stack to a terminal via the target distributed unit, and the terminal may receive the configuration information of the first protocol stack and the configuration information of the second protocol stack.

The central unit may send a connection establishing message or a connection reestablishment message to the target distributed unit, in which the connection establishing message or the connection reestablishment message includes the configuration information of the first protocol stack and the configuration information of the second protocol stack, and the configuration information of the first protocol stack and the configuration information of the second protocol stack are the configuration information of the protocol stack for the radio bearer to be configured on the radio access network side. The target distributed unit sends the connection establishing message or the connection reestablishing message to the terminal after the connection establishing message or the connection reestablishing message is received.

In step S509, the terminal may configure the radio network protocol stack corresponding to the radio bearer on a terminal side according to the configuration information of the first protocol stack and the configuration information of the second protocol stack.

The protocol stack corresponding to the radio bearer to be configured on the terminal side may be configured in the terminal after the terminal receives the configuration information of the protocol stack corresponding to the radio bearer to be configured on the radio access network side. Configuration of the radio bearer to be configured may be finished after the protocol stack corresponding to the radio bearer to be configured on the terminal side is configured successfully.

According to the method for configuring the radio bearer described in embodiments of the present disclosure, for a radio network protocol stack corresponding to the radio bearer to be configured on a radio access network side, the central unit and the target distributed unit negotiate about protocol layers of the radio network protocol stack to be allocated in the central unit and the target distributed unit respectively and perform corresponding configurations respectively, which means that the partition of the protocol layers between the central unit and the target distributed unit is not fixed in a distributed radio access network. Instead, the protocol layers are partitioned according to indications of the central unit and various means of the partitions of the protocol layers on the radio access network side are provided, such that the radio bearer may be applied to different service requirements flexibly and an access performance of a radio access network may be improved.

Additionally, according to the method for configuring the radio bearer described in embodiments of the present disclosure, the central unit acquires partitioning decision information including at least one of a quality of service requirement of a service corresponding to the radio bearer, loading information of the central unit and the target distributed unit, and delay information between the central unit and the target distributed unit, protocol partitioning information may be generated according to the partitioning decision information acquired, and the protocol layers of the radio bearer may be partitioned dynamically according to the quality of service, loading information and delay information of network devices, such that the configured radio bearer may meet network transmission requirements better.

Figure 7:
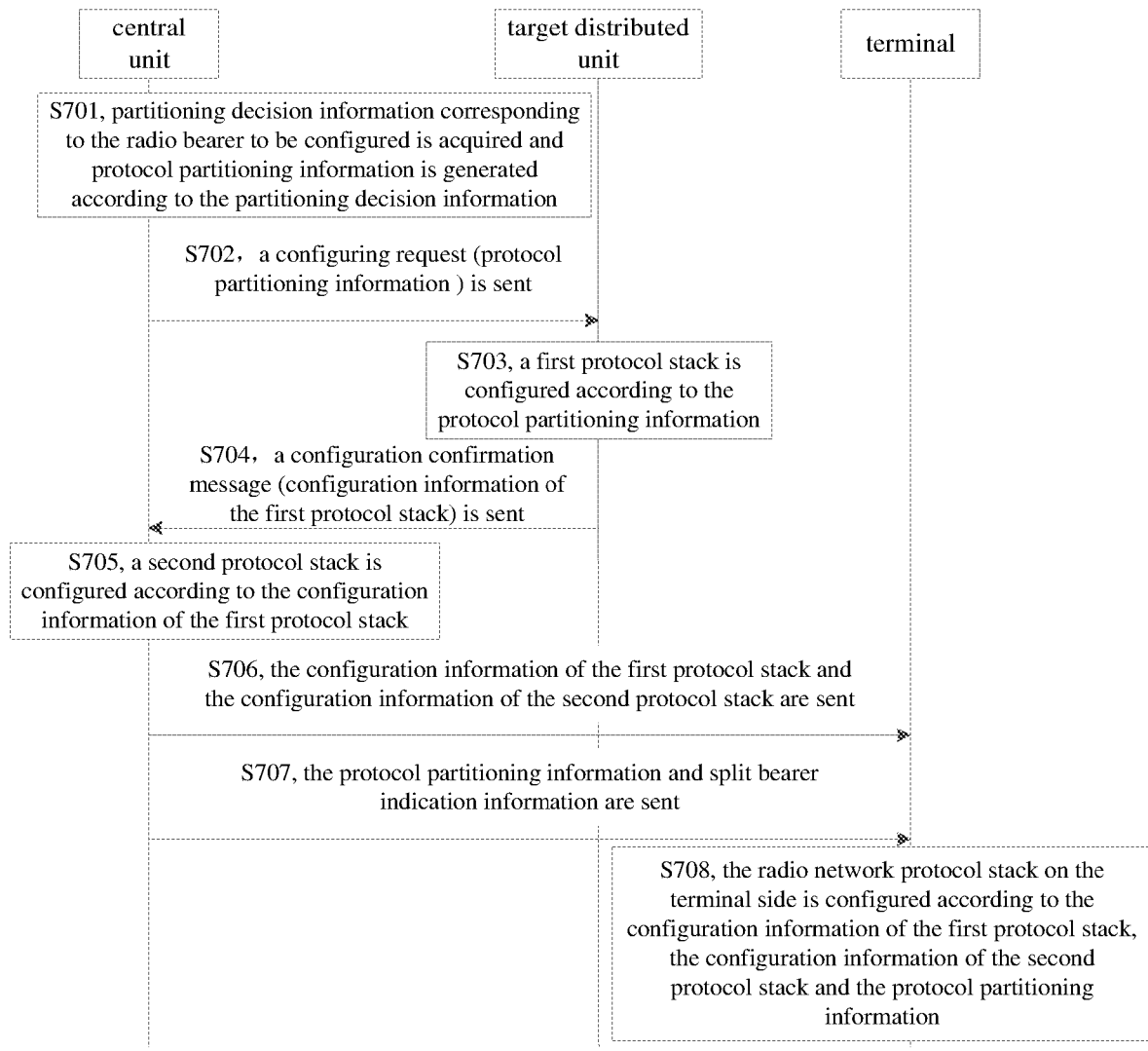
FIG. 7 is a flow chart illustrating a method for configuring a radio bearer according to an exemplary embodiment of the present disclosure.

FIG. 7 is a flow chart illustrating a method for configuring a radio bearer according to an exemplary embodiment of the present disclosure. As shown in FIG. 7, the method is applied to the implementing environment illustrated in FIG. 1 so as to add a new SRB or DRB after a wireless connection is established, or to reconfigure an existing SRB or DRB, for example. The method may include following steps.

In step S701, the central unit acquires partitioning decision information corresponding to the radio bearer to be configured and generates protocol partitioning information according to the partitioning decision information, when the radio bearer is added or reconfigured.

The radio bearer may be the SRB configured in a process that the wireless connection is established. The protocol partitioning information indicates an assignment of each protocol layer of a radio-side protocol stack between the central unit and the target distributed unit, and the radio-side protocol stack is a radio network protocol stack corresponding to the radio bearer on a radio access network side.

The partitioning decision information includes at least one of a quality of service requirement of a service corresponding to the radio bearer, loading information of the central unit and the target distributed unit, and delay information between the central unit and the target distributed unit.

In this step, concerning the content about the central unit generating the protocol partitioning information, references is made to the description in step 503 (FIG. 5), which is not repeated herein.

In step S702, the central unit sends a configuring request to the target distributed unit, and the target distributed unit receives the configuring request.

The configuring request includes the protocol partitioning information of the radio bearer to be configured.

In step S703, the target distributed unit may configure a first protocol stack according to the protocol partitioning information included in the configuring request.

The first protocol stack includes first protocol layers assigned to the target distributed unit in the radio-side protocol stack.

In some embodiments of the present disclosure, the central unit may also send resource allocation indication information to the to the target distributed unit, in which the resource allocation indication information is configured to indicate to the target distributed unit allocating resource for configuring the first protocol stack, and the resource includes at least one of storage resource and computing resource.

In step S704, the target distributed unit may send a configuration confirmation message to the central unit, in which the configuration confirmation message includes the configuration information of the first protocol stack, and the central unit receives the configuration confirmation message.

The configuration information of the first protocol stack may be sent to the central unit along with the configuration confirmation message after the target distributed unit configures the first protocol stack successfully.

In step S705, the central unit configures a second protocol stack according to the configuration information of the first protocol stack, in which the second protocol stack includes second protocol layers assigned to the central unit in the radio-side protocol stack.

In step S706, the central unit may send the configuration information of the first protocol stack and the configuration information of the second protocol stack to the terminal by the target distributed unit, and the terminal receives the configuration information of the first protocol stack and the configuration information of the second protocol stack.

In embodiments of the present disclosure, the central unit may send a connection reconfiguration message to the target distributed unit, in which the connection reconfiguration message includes the configuration information of the first protocol stack and the configuration information of the second protocol stack, and the configuration information of the first protocol stack and the configuration information of the second protocol stack are the configuration information of protocol stack corresponding to the radio bearer to be configured on a radio access network side. The target distributed unit sends the connection establishing message or the connection reestablishing message to the terminal after the connection establishing message or the connection reestablishing message is received.

In step S707, the central unit may send the protocol partitioning information and split bearer indication information to the terminal by the target distributed unit, and the terminal may receive the protocol partitioning information and the split bearer indication information.

The split bearer indication information is configured to indicate that the radio bearer bears to receive and transmit a signal via the at least two distributed units including the target distributed unit, or the radio bearer bears to receive and transmit the signal via the central unit and a radio access point device, in which the radio access point device and the central unit support different radio access technologies respectively.

The central unit may send the protocol partitioning information and the split bearer indication information to the target distributed unit along with the connection reconfiguration message.

In step S708, the terminal may configure the radio network protocol stack corresponding to the radio bearer on the terminal side according to the configuration information of the first protocol stack, the configuration information of the second protocol stack and the protocol partitioning information.

The protocol stack corresponding to the radio bearer to be configured on the terminal side may be configured in the terminal after the terminal receives the configuration information of the protocol stack corresponding to the radio bearer to be configured on the radio access network side. Configuration of the radio bearer to be configured may be finished after the protocol stack corresponding to the radio bearer to be configured on the terminal side is configured successfully.

In embodiments of the present disclosure, the radio bearer to be configured may be a split bearer which may be transmitted via two or more distributed units connecting to the central unit, in which the two or more distributed units are configured with the first protocol stack corresponding to the radio bearer respectively.

Figure 8:
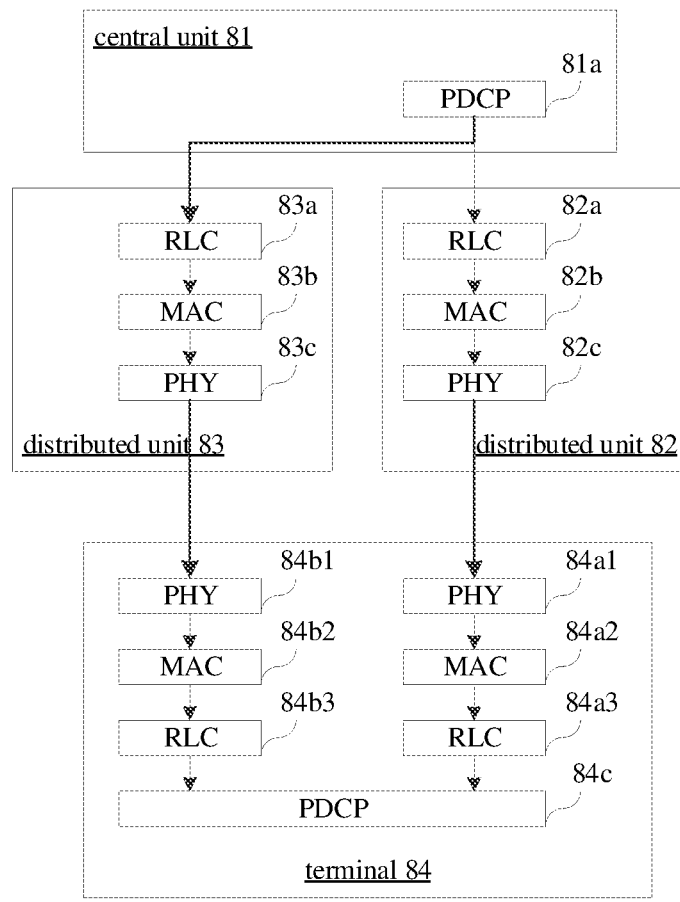
FIG. 8 is a schematic diagram illustrating a structure of a protocol stack in the case of a split bearer related to the exemplary embodiment of FIG. 7.

For example, referring to FIG. 8, a schematic diagram illustrating a structure of a protocol stack in a case of a split bearer is shown. The central unit 81 connects to the distributed unit 82 and the distributed unit 83 respectively, in which one radio bearer may be transmitted via the distributed unit 82 and the distributed unit 83 at the same time. When the radio bearer is configured, a PDCP layer 81a may be configured in the central unit 81, a protocol stack including an RLC layer 82a, a MAC layer 82b, and a PHY layer 82c may be configured in the distributed unit 82, and a protocol stack including an RLC layer 83a, a MAC layer 83b, and a PHY layer 83c may be configured in the distributed unit 83. Accordingly, in the terminal 84, a protocol stack including a PHY layer 84a1, a MAC layer 84a2, and an RLC layer 84a3 may be configured corresponding to the distributed unit 82 and a protocol stack including a PHY layer 84b1, a MAC layer 84b2, and an RLC layer 84b3 may be configured corresponding to the distributed unit 83, and a PDCP layer 84c may be configured corresponding to the RLC layer 84a3 and the RLC layer 84b3.

In an embodiment, the radio bearer may be transmitted via the central unit and another radio access point device supporting a radio access technology different from that supported by the central unit at the same time. In this case, split bearer indication information may indicate that the radio bearer is a split bearer split by another radio access technology other than the radio access technology the central unit supports. At this moment, the central unit needs to configure the function partition of the protocol layers reasonably and ensures that the protocol layers (the PDCP layer in LTE) which are corresponding to the split bearer and already included in a radio access point device corresponding to another radio access technology are not included in the distributed unit, which means that the distributed unit is not required to know whether a certain bearer is the split bearer obtained from another radio access technology. Besides, the partition of the protocol layers between the central unit and the distributed unit is transparent to the radio access point device corresponding to another radio access technology, which may be realized by the central unit via an adapter sub-unit. The adapter sub-unit mainly solves matching problems between two types of radio access technologies. For example, between two types of radio access technologies, transmissions of data package are fed back to each other and a maximum SN number of the data package which is sent in order successfully is indicated for each other.

Figure 9:
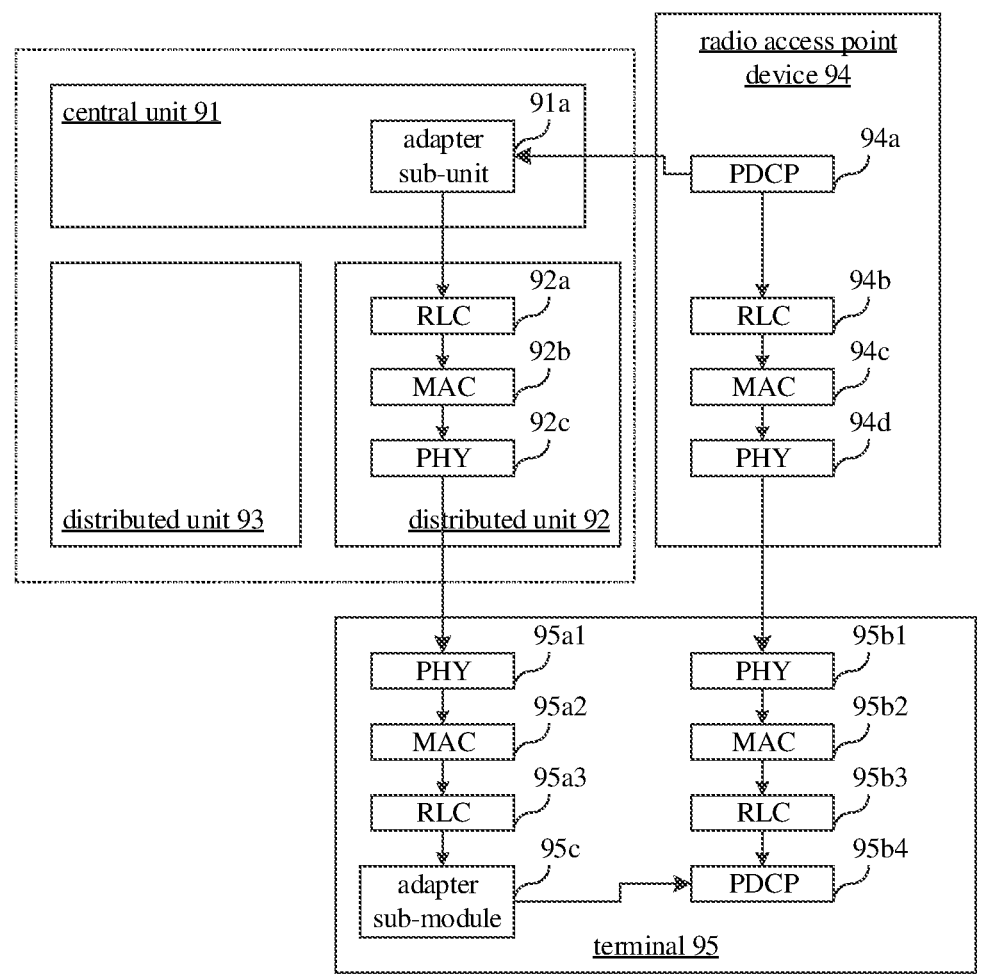
FIG. 9 is a schematic diagram illustrating a structure of a protocol stack in the case of another split bearer related to the exemplary embodiment of FIG. 7.

For example, referring to FIG. 9, a schematic diagram illustrating a structure of a protocol stack in a case of a split bearer is shown, a central unit 91 supports a new radio access technology, the central unit 91 connects to a distributed unit 92 and a distributed unit 93 respectively, one radio bearer may be transmitted via the distributed unit 92, and the radio bearer is also a split bearer from a radio access point device 94 supporting LTE. When configuring the radio bearer, a PDCP layer 94a corresponding to the radio bearer on a radio access network side is configured in the radio access point device 94, a protocol stack including an RLC layer 92a, a MAC layer 92b, and a PHY layer 92c may be configured in the distributed unit 92, a protocol stack including an RLC layer 94b, a MAC layer 94c, and a PHY layer 94d may be configured in the radio access point device 94, an adapter sub-unit 91a may be configured in the central unit 91, in which the adapter sub-unit 91a is configured to adapt the RLC layer 92a in the distributed unit 92 to the PDCP layer 94a in the radio access point device 94. Accordingly, in the terminal 95, a protocol stack including a PHY layer 95a1, a MAC layer 95a2, and an RLC layer 95a3 may be configured corresponding to the distributed unit 92 and a protocol stack including a PHY layer 95b1, a MAC layer 95b2, and an RLC layer 95b3 may be configured corresponding to the radio access point device 94, and the adapter sub-module 95c may be configured, in which the adapter sub-module 95c is configured to adapt the RLC layer 95a3 and the PDCP layer 95b4.

In an embodiment, the radio bearer may be transmitted via the central unit and another radio access point device supporting a radio access technology different from that supported by the central unit at the same time. Besides, the radio bearer may be transmitted via two or more distributed units connecting to the central unit on the radio access network side of the central unit.

Figure 10:
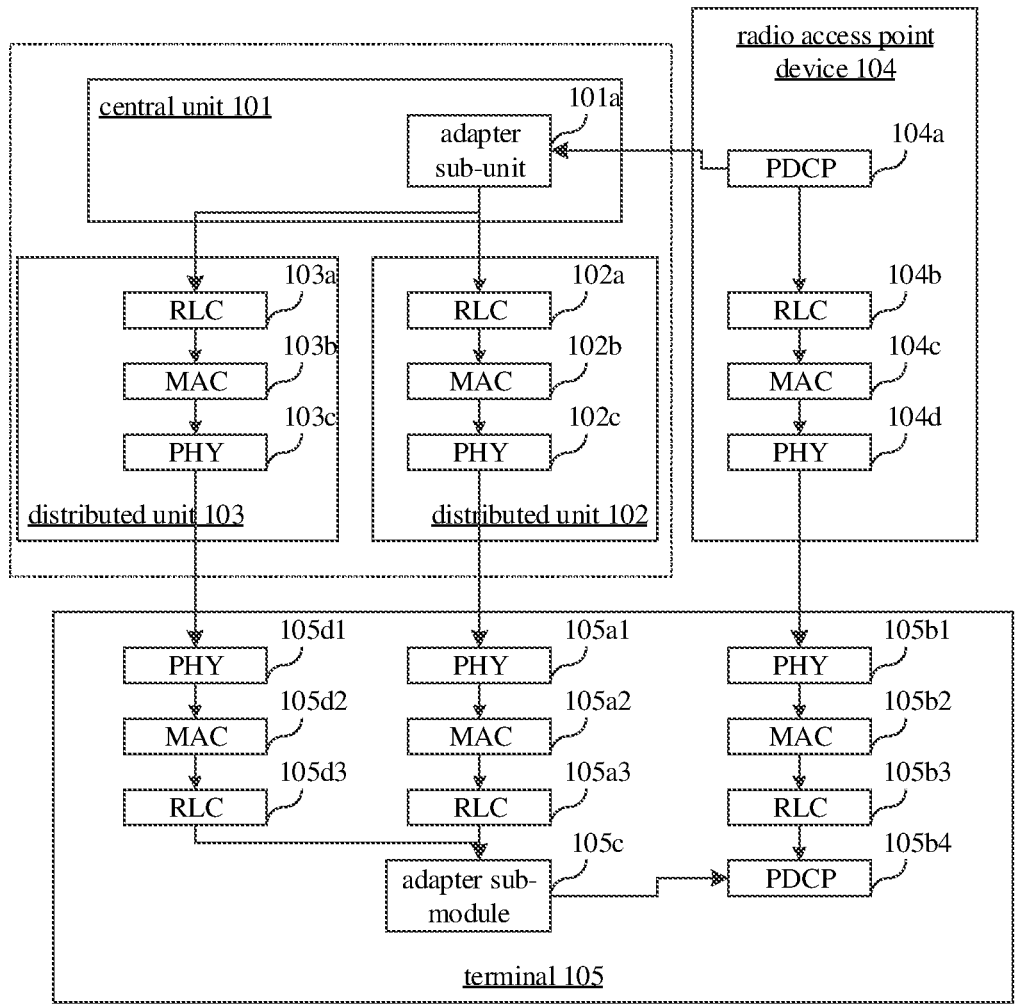
FIG. 10 is a schematic diagram illustrating a structure of a protocol stack in the case of yet another split bearer related to the exemplary embodiment of FIG. 7.

For example, referring to FIG. 10, a schematic diagram illustrating a structure of a protocol stack in a case of a split bearer is shown, a central unit 101 supports a new radio access technology, the central unit 101 connects a distributed unit 102 and a distributed unit 103 respectively, in which one radio bearer may be transmitted via the distributed unit 102 and the distributed unit 103, and the radio bearer is also a split bearer from a radio access point device 104 supporting LTE. When configuring the radio bearer, a PDCP layer 104a corresponding to the radio bearer on a radio access network side is configured in the radio access point device 104, a protocol stack including an RLC layer 102a, a MAC layer 102b, and a PHY layer 102c may be configured in the distributed unit 102, a protocol stack including an RLC layer 103a, a MAC layer 103b, and a PHY layer 103c may be configured in the distributed unit 103, a protocol stack including an RLC layer 104b, a MAC layer 104c, and a PHY layer 104d may be configured in the radio access point device 104, and an adapter sub-unit 101a may be configured in the central unit 101, in which the adapter sub-unit 101a is configured to adapt the RLC layer 102a in the distributed unit 102, the RLC layer 103a in the distributed unit 103, and the PDCP layer 104a in the radio access point device 104. Accordingly, in the terminal 105, a protocol stack including a PHY layer 105a1, a MAC layer 105a2, and an RLC layer 105a3 may be configured corresponding to the distributed unit 102, a protocol stack including a PHY layer 105b1, a MAC layer 105b2, and an RLC layer 105b3 and a PDCP layer 105b4 may be configured corresponding to the radio access point device 104, and a protocol stack including a PHY layer 105d1, a MAC layer 105d2, and an RLC layer 105d3 may be configured corresponding to the distributed unit 103, and the adapter sub-module 105c may be configured, in which the adapter sub-module 105c is configured to adapt the RLC layer 105a3, the RLC layer 105d3, and the PDCP layer 105b4.

According to the method for configuring the radio bearer described in embodiments of the present disclosure, for a radio network protocol stack corresponding to the radio bearer to be configured on a radio access network side, the central unit and the target distributed unit negotiate about protocol layers of the radio network protocol stack to be allocated in the central unit and the target distributed unit respectively and perform corresponding configurations respectively, which means that the partition of the protocol layers between the central unit and the target distributed unit is not fixed in a distributed radio access network. Instead, the protocol layers are partitioned according to indications of the central unit and various means of the partitions of the protocol layers on the radio access network side are provided, such that the radio bearer may be applied to different service requirements flexibly and an access performance of a radio access network may be improved.

Additionally, according to the method for configuring the radio bearer described in embodiments of the present disclosure, the central unit acquires partitioning decision information including at least one of a quality of service requirement of a service corresponding to the radio bearer, loading information of the central unit and the target distributed unit, and delay information between the central unit and the target distributed unit, protocol partitioning information may be generated according to the partitioning decision information acquired, and the protocol layers of the radio bearer may be partitioned dynamically according to the quality of service, loading information and delay information of network devices, such that the radio bearer configured may meet network transmission requirements better.

Further, according to the method for configuring the radio bearer described in embodiments of the present disclosure, when the radio bearer to be configured is a split bearer, the central unit may send the protocol partitioning information and split bearer indication information to the terminal by the target distributed unit, and may indicate the terminal to configure the radio network protocol stack corresponding to the radio bearer to be configured on the terminal side according to the configuration information of the first protocol stack, the configuration information of the second protocol stack and the protocol partitioning information, so as to support a flexible configuration for the protocol layers of the split bearer.

Apparatus embodiments of the present disclosure will be described as follows, which may be used to perform method embodiments of the present disclosure. Concerning details which are not disclosed in the apparatus embodiments, reference is made to the method embodiments.

Figure 11:
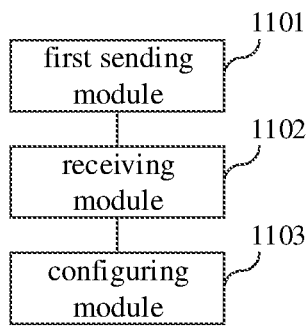
FIG. 11 is a block diagram illustrating an apparatus for configuring a radio bearer according to an exemplary embodiment of the present disclosure.

FIG. 11 is a block diagram illustrating an apparatus for configuring a radio bearer according to an exemplary embodiment of the present disclosure. As shown in FIG. 11, the apparatus for configuring the radio bearer may be implemented as all or a part of a central unit in the implementing environment illustrated in FIG. 1 by hardware or a combination of hardware and software. The apparatus may include: a first sending module 1101, a receiving module 1102, and a configuring module 1103.

The first sending module 1101 is configured to send protocol partitioning information for the radio bearer to be configured to a target distributed unit, in which the protocol partitioning information indicates an assignment of each protocol layer of a radio-side protocol stack between the central unit and the target distributed unit, the radio-side protocol stack is a radio network protocol stack corresponding to the radio bearer on a radio access network side, and the target distributed unit is one of the at least two distributed units.

The receiving module 1102 is configured to receive configuration information of a first protocol stack sent by the target distributed unit, in which the first protocol stack is configured by the target distributed unit according to the protocol partitioning information, and the first protocol stack includes first protocol layers assigned to the target distributed unit in the radio-side protocol stack.

The configuring module 1103 is configured to configure a second protocol stack according to the configuration information of the first protocol stack received by the receiving module 1102, in which the second protocol stack includes second protocol layers assigned to the central unit in the radio-side protocol stack.

According to the apparatus for configuring the radio bearer described in embodiments of the present disclosure, for a radio network protocol stack corresponding to the radio bearer to be configured on a radio access network side, the central unit and the target distributed unit negotiate about protocol layers of the radio network protocol stack to be allocated in the central unit and the target distributed unit respectively and perform corresponding configurations respectively, which means that the partition of the protocol layers between the central unit and the target distributed unit is not fixed in a distributed radio access network. Instead, the protocol layers are partitioned according to indications of the central unit and various means of the partitions of the protocol layers on the radio access network side are provided, such that the radio bearer may be applied to different service requirements flexibly and an access performance of a radio access network may be improved.

Figure 12:
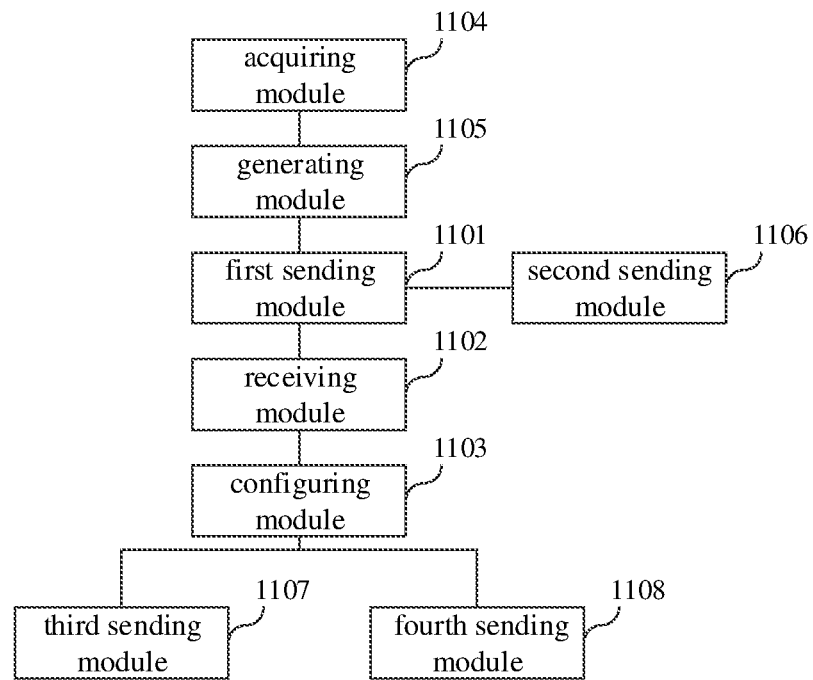
FIG. 12 is a block diagram illustrating an apparatus for configuring a radio bearer according to an exemplary embodiment of the present disclosure.

In another embodiment based on the embodiment provided in FIG. 11, as shown in FIG. 12, the apparatus further includes: an acquiring module 1104, configured to acquire partitioning decision information corresponding to the radio bearer before the first sending module 1101 sends the protocol partitioning information for the radio bearer to be configured to the target distributed unit; and a generating module 1105, configured to generate the protocol partitioning information according to the partitioning decision information, in which the partitioning decision information includes at least one of a quality of service requirement of a service corresponding to the radio bearer, loading information of the central unit and the target distributed unit, and delay information between the central unit and the target distributed unit.

In an embodiment, the protocol partitioning information includes an identification of a top protocol layer assigned to the target distributed unit in the radio-side protocol stack.

In an embodiment, as shown in FIG. 12, the apparatus further includes: a second sending module 1106, configured to send resource allocation indication information to the target distributed unit, in which the resource allocation indication information is configured to indicate to the target distributed unit allocating resource for configuring the first protocol stack, and the resource includes at least one of storage resource and computing resource.

In an embodiment, as shown in FIG. 12, the apparatus further includes: a third sending module 1107, configured to send the configuration information of the first protocol stack and the configuration information of the second protocol stack to a terminal by the target distributed unit, such that the terminal configures the radio network protocol stack corresponding to the radio bearer on a terminal side according to the configuration information of the first protocol stack and the configuration information of the second protocol stack.

In an embodiment, as shown in FIG. 12, the apparatus further includes: a fourth sending module 1108, configured to send the protocol partitioning information and split bearer indication information to the terminal by the target distributed unit, in which the split bearer indication information is configured to indicate that the radio bearer bears to receive and transmit a signal via the at least two distributed units including the target distributed unit, or the radio bearer bears to receive and transmit the signal via the central unit and a radio access point device, in which the radio access point device and the central unit support different radio access technologies respectively.

Figure 13:
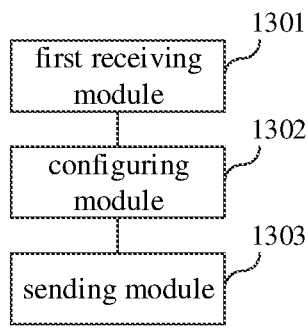
FIG. 13 is a block diagram illustrating an apparatus for configuring a radio bearer according to an exemplary embodiment of the present disclosure.

FIG. 13 is a block diagram illustrating an apparatus for configuring a radio bearer according to an exemplary embodiment of the present disclosure. As shown in FIG. 13, the apparatus for configuring the radio bearer may be implemented as all or a part of a target distributed unit in the implementing environment illustrated in FIG. 1 by hardware or a combination of hardware and software, and the target distributed unit is one of the at least two distributed units. The apparatus may include: a first receiving module 1301, a configuring module 1302, and a sending module 1303.

The first receiving module 1301 is configured to receive protocol partitioning information for the radio bearer to be configured, in which the protocol partitioning information is sent by the central unit and indicates an assignment of each protocol layer of a radio-side protocol stack between the central unit and the target distributed unit, and the radio-side protocol stack is a radio network protocol stack corresponding to the radio bearer on a radio access network side.

The configuring module 1302 is configured to configure a first protocol stack according to the protocol partitioning information received by the first receiving module 1301, in which the first protocol stack includes first protocol layers assigned to the target distributed unit in the radio-side protocol stack.

The sending module 1303 is configured to send configuration information of the first protocol stack configured by the configuring module to the central unit, such that the central unit configures a second protocol stack according to the configuration information of the first protocol stack, and the second protocol stack includes second protocol layers assigned to the central unit in the radio-side protocol stack.

According to the apparatus for configuring the radio bearer described in embodiments of the present disclosure, for a radio network protocol stack corresponding to the radio bearer to be configured on a radio access network side, the central unit and the target distributed unit negotiate about protocol layers of the radio network protocol stack to be allocated in the central unit and the target distributed unit respectively and perform corresponding configurations respectively, which means that the partition of the protocol layers between the central unit and the target distributed unit is not fixed in a distributed radio access network. Instead, the protocol layers are partitioned according to indications of the central unit and various means of the partitions of the protocol layers on the radio access network side are provided, such that the radio bearer may be applied to different service requirements flexibly and an access performance of a radio access network may be improved.

In an embodiment, the protocol partitioning information includes: an identification of a top protocol layer assigned to the target distributed unit in the radio-side protocol stack.

Figure 14:
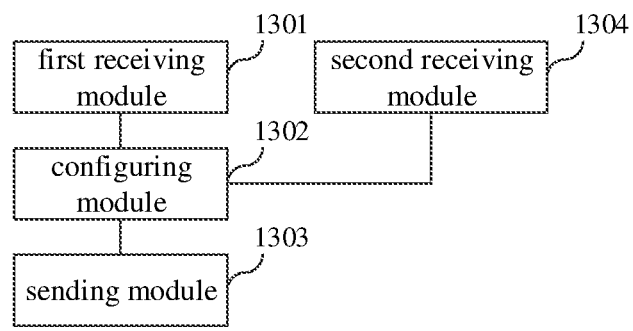
FIG. 14 is a block diagram illustrating an apparatus for configuring a radio bearer according to an exemplary embodiment of the present disclosure.

In another embodiment based on the embodiment provided in FIG. 13, as shown in FIG. 14, the apparatus further includes: a second receiving module 1304, configured to receive resource allocation indication information sent by the central unit before the configuring module configures the first protocol stack according to the protocol partitioning information; and the configuring module 1302 is further configured to allocate resource for configuring the first protocol stack according to the resource allocation indication information, in which the resource includes at least one of storage resource and computing resource.

Exemplary embodiments of the present disclosure also provide a system for configuring a radio bearer including a central unit and distributed units.

The central unit includes the apparatus for configuring the radio bearer according to the embodiment shown in FIG. 11 or any other embodiment based on the embodiment shown in FIG. 11.

The distributed unit includes the apparatus for configuring the radio bearer according to the embodiment shown in FIG. 13 or any other embodiment based on the embodiment shown in FIG. 13.

It should be noted that, when the apparatus provided by the above-described embodiments performs functions thereof, the division of the above functional modules is described as only an example. In practical applications, the functions may be allocated to different modules for implementation according to practical requirements, i.e., the internal structure of the apparatus may be divided into different modules to perform all or a part of the functions described above.

With respect to the apparatus according to above-described embodiments, specific means for performing operations for individual units therein have been described in the method embodiments, which may be not described herein.

Exemplary embodiments of the present disclosure also provide a device for configuring a radio bearer, configured to realize the method for configuring the radio bearer performed by the central unit illustrated in FIG. 4, FIG. 5 or FIG. 7. The device includes: a processor and a memory configured to store an instruction executable by the processor; in which the processor is configured to: send protocol partitioning information for the radio bearer to be configured to a target distributed unit, in which the protocol partitioning information indicates an assignment of each protocol layer of a radio-side protocol stack between the central unit and the target distributed unit, the radio-side protocol stack is a radio network protocol stack corresponding to the radio bearer on a radio access network side, and the target distributed unit is one of the at least two distributed units; receive configuration information of a first protocol stack sent by the target distributed unit, in which the first protocol stack is configured by the target distributed unit according to the protocol partitioning information, and the first protocol stack includes first protocol layers assigned to the target distributed unit in the radio-side protocol stack; and configure a second protocol stack according to the configuration information of the first protocol stack, in which the second protocol stack includes second protocol layers assigned to the central unit in the radio-side protocol stack.

In an embodiment, the processor is also configured to: acquire partitioning decision information corresponding to the radio bearer before the protocol partitioning information for the radio bearer to be configured is sent to the target distributed unit; and generate the protocol partitioning information according to the partitioning decision information, in which the partitioning decision information includes at least one of a quality of service requirement of a service corresponding to the radio bearer, loading information of the central unit and the target distributed unit, and delay information between the central unit and the target distributed unit.

In an embodiment, the protocol partitioning information includes an identification of a top protocol layer assigned to the target distributed unit in the radio-side protocol stack.

In an embodiment, the processor is also configured to: send resource allocation indication information to the target distributed unit, in which the resource allocation indication information is configured to indicate to the target distributed unit allocating resource for configuring the first protocol stack, and the resource includes at least one of storage resource and computing resource.

In an embodiment, the processor is also configured to: send the configuration information of the first protocol stack and the configuration information of the second protocol stack to a terminal by the target distributed unit, such that the terminal configures the radio network protocol stack corresponding to the radio bearer on a terminal side according to the configuration information of the first protocol stack and the configuration information of the second protocol stack.

In an embodiment, the processor is also configured to: send the protocol partitioning information and split bearer indication information to the terminal by the target distributed unit, in which the split bearer indication information is configured to indicate that the radio bearer bears to receive and transmit a signal via the at least two distributed units including the target distributed unit, and/or, the radio bearer bears to receive and transmit the signal via the central unit and a radio access point device, in which the radio access point device and the central unit support different radio access technologies respectively.

Exemplary embodiments of the present disclosure also provide a device for configuring a radio bearer, configured to realize the method for configuring the radio bearer performed by the target distributed unit illustrated in FIG. 4, FIG. 5 or FIG. 7. The device includes: a processor and a memory configured to store an instruction executable by the processor; in which the processor is configured to: receive protocol partitioning information for the radio bearer to be configured, in which the protocol partitioning information is sent by the central unit and indicates an assignment of each protocol layer of a radio-side protocol stack between the central unit and the target distributed unit, and the radio-side protocol stack is a radio network protocol stack corresponding to the radio bearer on a radio access network side; configure a first protocol stack according to the protocol partitioning information, in which the first protocol stack includes first protocol layers assigned to the target distributed unit in the radio-side protocol stack; and send configuration information of the first protocol stack to the central unit, such that the central unit configures a second protocol stack according to the configuration information of the first protocol stack, in which the second protocol stack includes second protocol layers assigned to the central unit in the radio-side protocol stack.

In an embodiment, the protocol partitioning information includes an identification of a top protocol layer assigned to the target distributed unit in the radio-side protocol stack.

In an embodiment, the processor is also configured to: receive resource allocation indication information sent by the central unit before the first protocol stack is configured according to the protocol partitioning information; and allocate resource for configuring the first protocol stack according to the resource allocation indication information, in which the resource includes at least one of storage resource and computing resource.

Solutions provided by embodiments of the present disclosure are introduced by taking a central unit and a distributed unit as an example. It should be understood that the central unit and the distributed unit include hardware structures and/or software modules for performing respective function so as to realize the above-mentioned functions. Combined with the modules and methods described in embodiments of the present disclosure, the embodiments may be accomplished by hardware or a combination of hardware and computer software. Whether a certain function is performed by hardware or computer software depends on specific applications and designed constraint conditions of the technical solutions. Those skilled in the art may use different methods for each specific application to accomplish the functions described above. It should not be considered that this accomplishment departs from a scope in accordance with the concept of the present disclosure.

Figure 15:
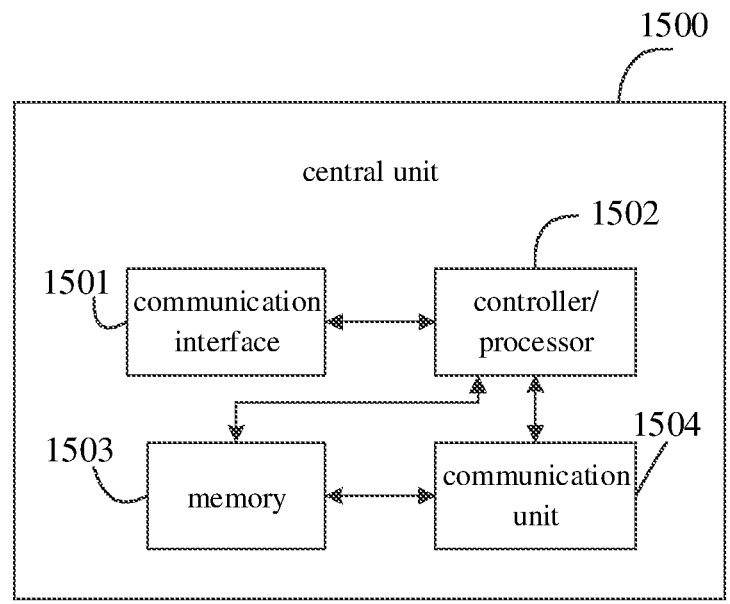
FIG. 15 is a block diagram illustrating an central unit according to an exemplary embodiment of the present disclosure.

FIG. 15 is a block diagram illustrating a central unit 1500 according to an exemplary embodiment of the present disclosure. The central unit 1500 includes a communication interface 1501 and a processor 1502. The processor 1502 may be a controller and is illustrated as "controller/processor 1502" in FIG. 15. The communication interface 1501 is configured to support sending and receiving messages between the central unit and the distributed units described above. The processor 1502 is configured to perform functions for communicating with the distributed units. In an uplink, protocol data from a distributed unit is received via the communication interface 1501 and processed by the processor 1502.

In a downlink, service data and signaling messages are processed by the processor 1502 and are sent to the distributed unit via the communication interface 1501.

Further, the central unit 1500 also includes a memory 1503 configured to store program codes and data of the central unit 1500. In addition, the central unit 1500 may also include a communication unit 1504 configured to support a communication between the central unit and other network entities (for example, a network device etc. in a core network). For example, in an LTE system, the communication unit 1504 may be S1-U interface configured to support a communication between the central unit and a serving gateway (S-GW); or the communication unit 1504 may be S1-MME interface configured to support a communication between the central unit and a mobility management entity (MME).

It will be understood that FIG. 15 merely illustrates an exemplary design of the central unit 1500. The central unit 1500 may include any number of communication interfaces, processors, controllers, memories and communication units etc. in practical applications. All central units which may accomplish embodiments of the present disclosure fall in the scope of the present disclosure.

Figure 16:
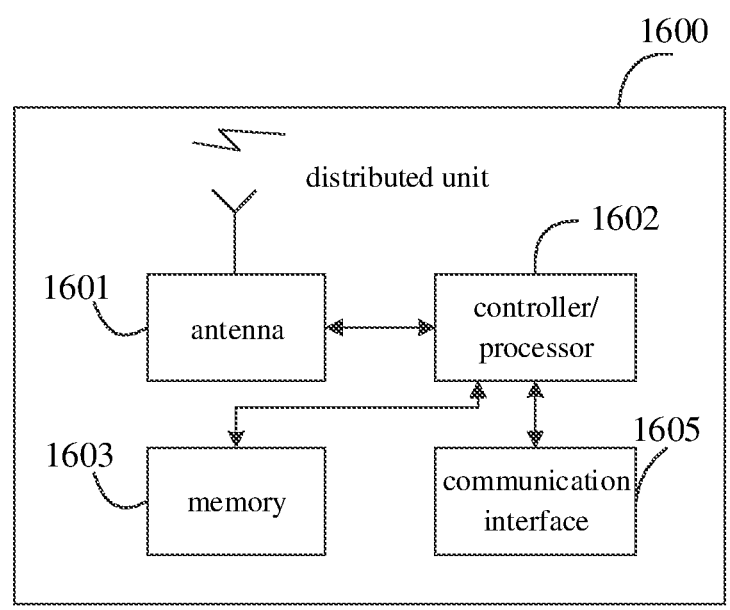
FIG. 16 is a block diagram illustrating a distributed unit according to an exemplary embodiment of the present disclosure.

FIG. 16 is a block diagram illustrating a distributed unit 1600 according to an exemplary embodiment of the present disclosure. The distributed unit 1600 includes an antenna 1601, a processor 1602 and a communication interface 1605. The processor 1602 may be a controller and is illustrated as "controller/processor 1602" in FIG. 16. The antenna 1601 is configured to support sending and receiving messages between the distributed unit and a terminal described above. The processor 1602 is configured to perform functions for communicating with the terminal. In an uplink, an uplink signal from the terminal is received via the antenna 1601 and processed by the processor 1602 and sent to the central unit via the communication interface 1605. In a downlink, protocol data received via the communication interface 1605 and sent by the central unit is processed by the processor 1602 and transmitted to the terminal via the antenna 1601.

Further, the distributed unit 1600 also includes a memory 1603 configured to store program codes and data of the distributed unit 1600.

It will be understood that FIG. 16 merely illustrates an exemplary design of the distributed unit 1600. The distributed unit 1600 may include any number of emitters, receivers, processors, controllers, memories and communication units etc. in practical applications. All distributed units which may accomplish embodiments of the present disclosure fall in the scope of the present disclosure.

It should be understood by those skilled in the art that, in one or more examples described-above, functions described in the present disclosure may be realized by hardware, software, firmware or combinations thereof. When software is used to realize the embodiments of the present disclosure, the functions may be stored in a computer readable storage medium or transmitted as one or more instructions or codes on the computer readable storage medium. The computer readable storage medium includes a computer storage medium and a communication medium, in which the communication medium includes any medium for transmitting a computer program from a place to another place. The computer storage medium may be any available medium which can be read by a common computer or a special-purpose computer.

Embodiments of the present disclosure also provides a computer storage medium, configured to store computer software instructions used by the central unit and the distributed unit described above, which includes a program for executing the method for configuring a radio bearer mentioned above.

Other implementations of the present disclosure will be apparent to those skilled in the art from consideration of the specification and practice of the invention disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for configuring a radio bearer applied to a central unit connecting to at least two distributed units, comprising:
    sending protocol partitioning information for the radio bearer to be configured to a target distributed unit, wherein the protocol partitioning information indicates an assignment of each protocol layer of a radio-side protocol stack between the central unit and the target distributed unit, the radio-side protocol stack is a radio network protocol stack corresponding to the radio bearer on a radio access network side, and the target distributed unit is one of the at least two distributed units;
    receiving configuration information of a first protocol stack sent by the target distributed unit, wherein the first protocol stack is configured by the target distributed unit according to the protocol partitioning information, and the first protocol stack comprises first protocol layers assigned to the target distributed unit in the radio-side protocol stack; and
    configuring a second protocol stack according to the configuration information of the first protocol stack, wherein the second protocol stack comprises second protocol layers assigned to the central unit in the radio-side protocol stack.

2. The method according to claim 1, further comprising:
    acquiring partitioning decision information corresponding to the radio bearer before the protocol partitioning information for the radio bearer to be configured is sent to the target distributed unit; and
    generating the protocol partitioning information according to the partitioning decision information,
    wherein the partitioning decision information comprises at least one of a quality of service requirement of a service corresponding to the radio bearer, loading information of the central unit and the target distributed unit, and delay information between the central unit and the target distributed unit.

3. The method according to claim 2, further comprising:
    receiving at least one of a connection establishing request and a connection reestablishing request sent by a terminal via the target distributed unit.

4. The method according to claim 3, wherein the at least one of a connection establishing request and a connection reestablishing request comprises information on a cell which the terminal tries to access.

5. The method according to claim 4, wherein the information on the cell comprises an identification of the cell, a physical identification of the cell, and a cell frequency point.

6. The method according to claim 1, wherein the protocol partitioning information comprises an identification of a top protocol layer assigned to the target distributed unit in the radio-side protocol stack.

7. The method according to claim 1, further comprising:
    sending resource allocation indication information to the target distributed unit, wherein the resource allocation indication information is configured to indicate to the target distributed unit allocating resource for configuring the first protocol stack, and the resource comprises at least one of storage resource and computing resource.

8. The method according to claim 1, further comprising:
sending the configuration information of the first protocol stack and the configuration information of the second protocol stack to a terminal by the target distributed unit, such that the terminal configures the radio network protocol stack corresponding to the radio bearer on a terminal side according to the configuration information of the first protocol stack and the configuration information of the second protocol stack.

9. The method according to claim 8, further comprising:
sending the protocol partitioning information and split bearer indication information to the terminal by the target distributed unit,
wherein the split bearer indication information is configured to indicate that the radio bearer bears to receive and transmit a signal via the at least two distributed units comprising the target distributed unit, or the radio bearer bears to receive and transmit the signal via the central unit and a radio access point device, wherein the radio access point device and the central unit support different radio access technologies.

10. A method for configuring a radio bearer applied to a target distributed unit, wherein the target distributed unit is one of at least two distributed units connecting to a central unit, and the method comprises:
receiving protocol partitioning information for the radio bearer to be configured, wherein the protocol partitioning information is sent by the central unit and indicates an assignment of each protocol layer of a radio-side protocol stack between the central unit and the target distributed unit, and the radio-side protocol stack is a radio network protocol stack corresponding to the radio bearer on a radio access network side;
configuring a first protocol stack according to the protocol partitioning information, wherein the first protocol stack comprises first protocol layers assigned to the target distributed unit in the radio-side protocol stack; and
sending configuration information of the first protocol stack to the central unit, such that the central unit configures a second protocol stack according to the configuration information of the first protocol stack, wherein the second protocol stack comprises second protocol layers assigned to the central unit in the radio-side protocol stack.

11. The method according to claim 10, wherein the protocol partitioning information comprises an identification of a top protocol layer assigned to the target distributed unit in the radio-side protocol stack.

12. The method according to claim 10, further comprising:
receiving resource allocation indication information sent by the central unit before the first protocol stack is configured according to the protocol partitioning information; and
allocating resource for configuring the first protocol stack according to the resource allocation indication information, wherein the resource comprises at least one of storage resource and computing resource.

13. An apparatus for configuring a radio bearer applied to a central unit connecting to at least two distributed units, comprising:

a processor;
a memory configured to store an instruction executable by the processor;
wherein the processor is configured to:
send protocol partitioning information for the radio bearer to be configured to a target distributed unit, wherein the protocol partitioning information indicates an assignment of each protocol layer of a radio-side protocol stack between the central unit and the target distributed unit, the radio-side protocol stack is a radio network protocol stack corresponding to the radio bearer on a radio access network side, and the target distributed unit is one of the at least two distributed units;
receive configuration information of a first protocol stack sent by the target distributed unit, wherein the first protocol stack is configured by the target distributed unit according to the protocol partitioning information, and the first protocol stack comprises first protocol layers assigned to the target distributed unit in the radio-side protocol stack; and
configure a second protocol stack according to the configuration information of the first protocol stack, wherein the second protocol stack comprises second protocol layers assigned to the central unit in the radio-side protocol stack.

14. The apparatus according to claim 13, wherein the processor is further configured to:
acquire partitioning decision information corresponding to the radio bearer before the protocol partitioning information for the radio bearer to be configured is sent to the target distributed unit; and
generate the protocol partitioning information according to the partitioning decision information,
wherein the partitioning decision information comprises at least one of a quality of service requirement of a service corresponding to the radio bearer, loading information of the central unit and the target distributed unit, and delay information between the central unit and the target distributed unit.

15. The apparatus according to claim 14, wherein the processor is further configured to:
receive at least one of a connection establishing request and a connection reestablishing request sent by a terminal via the target distributed unit.

16. The apparatus according to claim 15, wherein the at least one of a connection establishing request and a connection reestablishing request comprises information on a cell which the terminal tries to access.

17. The apparatus according to claim 13, wherein the protocol partitioning information comprises an identification of a top protocol layer assigned to the target distributed unit in the radio-side protocol stack.

18. The apparatus according to claim 13, wherein the processor is further configured to:
send resource allocation indication information to the target distributed unit, wherein the resource allocation indication information is configured to indicate to the target distributed unit allocating resource for configuring the first protocol stack, and the resource comprises at least one of storage resource and computing resource.

19. The apparatus according to claim 13, wherein the processor is further configured to:
send the configuration information of the first protocol stack and the configuration information of the second protocol stack to a terminal by the target distributed unit, such that the terminal configures the radio network protocol stack corresponding to the radio bearer on a terminal side according to the configuration information of the first protocol stack and the configuration information of the second protocol stack.

20. The apparatus according to claim 19, wherein the processor is further configured to:
send the protocol partitioning information and split bearer indication information to the terminal by the target distributed unit,
wherein the split bearer indication information is configured to indicate that the radio bearer bears to receive and transmit a signal via the at least two distributed units comprising the target distributed unit, or the radio bearer bears to receive and transmit the signal via the central unit and a radio access point device, wherein the radio access point device and the central unit support different radio access technologies.

* * * * *